US 6,685,404 B2

(12) United States Patent
Udivich et al.

(10) Patent No.: US 6,685,404 B2
(45) Date of Patent: Feb. 3, 2004

(54) METHOD, SYSTEM, AND DEVICE FOR TRANSPORTING GAS CYLINDERS (75) Inventors: Joseph Udivich, Aurora, OH (US); Bernard Dessolle, Freneuse (FR)

(73) Assignee: AGA Gas, Inc., Independence, OH (US)

( * ) Notice: Subject to any disclaimer, the term of this patent is extended or adjusted under 35 U.S.C. 154(b) by 0 days.

(21) Appl. No.: 10/104,286

(22) Filed: Mar. 22, 2002

(65) Prior Publication Data

US 2003/0180113 A1 Sep. 25, 2003

(51) Int. Cl.$^7$ ................................................ B61D 3/16
(52) U.S. Cl. ............................ 410/42; 410/32; 410/36; 410/46; 211/85.18
(58) Field of Search ..................... 108/55.3; 211/13.1, 211/60.1, 85.18; 224/42.33, 405, 572; 296/3, 4; 410/31, 32, 35, 36, 42, 46, 47, 71, 80; 414/498

(56) References Cited

U.S. PATENT DOCUMENTS

| | | | | |
|---|---|---|---|---|
| 3,451,573 A | | 6/1969 | Josephian | 414/498 |
| 3,602,368 A | * | 8/1971 | Gould | 206/598 |
| 3,710,997 A | * | 1/1973 | Asikainen | 224/628 |
| 3,786,947 A | * | 1/1974 | Craft, III | 414/679 |
| 3,934,926 A | | 1/1976 | Bennett | 410/80 |
| 3,993,344 A | | 11/1976 | Bennett | 410/36 |
| 4,061,391 A | | 12/1977 | Violette | 410/68 |
| 4,089,539 A | | 5/1978 | Berger | 410/80 |
| 4,231,695 A | | 11/1980 | Weston, Sr. | 410/69 |
| 4,462,746 A | | 7/1984 | Smets | 414/795.4 |
| 4,542,774 A | | 9/1985 | Stavlo | 141/1 |
| 4,564,109 A | | 1/1986 | Stavlo | 206/597 |
| 4,642,007 A | | 2/1987 | Marshall et al. | 410/78 |
| 4,708,572 A | | 11/1987 | Kölker | 414/540 |
| 4,775,057 A | * | 10/1988 | Zingeser | 211/133.1 |
| 4,787,514 A | * | 11/1988 | Shepherd | 206/427 |
| 5,000,344 A | * | 3/1991 | Janssen | 221/92 |
| 5,022,809 A | | 6/1991 | Hinson | 414/494 |
| 5,573,360 A | | 11/1996 | Bennett | 410/84 |
| 5,954,099 A | * | 9/1999 | Princiotta et al. | 141/18 |
| 6,135,297 A | * | 10/2000 | DeShazo et al. | 211/74 |
| 6,224,314 B1 | | 5/2001 | Mann | 414/392 |
| 6,405,882 B1 | * | 6/2002 | Baxter | 211/85.18 |
| 6,494,549 B2 | * | 12/2002 | Van Daalwyk | 312/72 |

* cited by examiner

Primary Examiner—Stephen T. Gordon
Assistant Examiner—Paul Chenevert
(74) Attorney, Agent, or Firm—Pearne & Gordon LLP (57) ABSTRACT A pallet, and a system suitable for use with the pallet, for supporting and transporting gas cylinders in an inclined position. The pallet includes a supporting base frame. A pair of horizontally spaced, upstanding and parallel side frame members are rigidly secured to the base frame. A plurality of cylinder carriers or tubes are positioned between the side frame members. The carriers are disposed in an inclined position at an angle $\alpha$. The system includes a load-supporting bed forming part of a vehicle. A plurality of longitudinally spaced-apart and laterally extending bays are arranged in two longitudinally extending rows disposed on the bed. A walkway is disposed on the bed and raised therefrom, the walkway extends between the two longitudinally extending rows and a plurality of pallets. The system may also include a latching arrangement that engages the base of the pallets to retain the pallets in its respective bay during transportation.

22 Claims, 9 Drawing Sheets

METHOD, SYSTEM, AND DEVICE FOR TRANSPORTING GAS CYLINDERS

BACKGROUND OF THE INVENTION

1. Field of the Invention

The present invention relates to containers for transporting goods and their arrangement in a transporting vehicle, and specifically, to a storage and transportation system and method employing pallets for delivering pressurized gas cylinders to a customer.

2. Description of the Related Art

Pressurized gas cylinders are used in a number of operations (e.g., healthcare) requiring the storage of specialized industrial gases. These cylinders may be filled with gases such as oxygen, propane, acetylene, argon, nitrogen, or others. The cylinders are generally filled with the gas before delivery to a customer.

Attempts have been made in the prior art to improve the process of transporting gas cylinders to the customer. These attempts typically provide for the cylinders to be transported in an upright or vertical position, typically standing on their bottom ends. Some of the teachings in the prior art relating to the transportation of gas cylinders are the following.

U.S. Pat. No. 4,642,007 provides a method and apparatus for delivering gas cylinders in a vertical position whereby pallets are loaded onto a truck frame. In the '007 patent, the gas cylinders are held in the pallet in a vertical position using straps.

U.S. Pat. No. 3,993,344 discloses a plurality of pallets on a flatbed truck in a vertical position. In the '344 patent, the gas cylinders are held in the pallet in a vertical position using chains. The pallet is automatically aligned and secured in place in a chosen bay.

Figure 10:
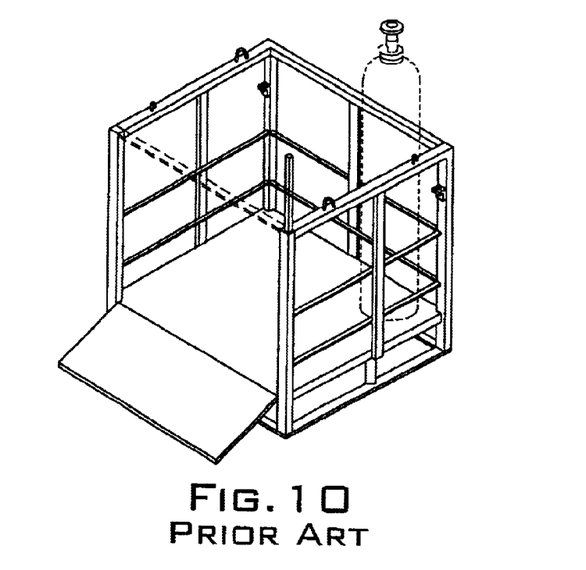
FIG. 10 is a perspective view of a PRIOR ART pallet.

U.S. Pat. No. 4,295,431 (see FIG. 10 PRIOR ART) discloses a pallet for holding pressurized gas cylinders in a vertical position. An upper gate member serves to assist in retaining the cylinders within the confines of the pallet. A lower gate member is pivotally connected and forms a ramp to facilitate the loading and unloading of the gas cylinders onto and off of the top of the floor structure.

The prior art reveals apparatus and systems where the gas cylinders are typically maintained in a vertical position. By capturing the gas cylinders in an inclined position, as in the newly designed pallet and system disclosed, access is available to every gas cylinder being transported without having to rearrange the gas cylinders or pallets on the transport vehicle in order for the operator to gain access to a cylinder with an appropriate gas needed by the customer at delivery.

SUMMARY OF THE INVENTION

It is one aspect of this invention to provide a pallet for use in capturing and transporting gas cylinders in their inclined position. The pallet includes a supporting base frame, a pair of horizontally spaced, upstanding and parallel side frame members rigidly secured to the base frame, and cylinder carriers. The cylinder carriers are positioned between the side frame members. The cylinder carriers being disposed in an inclined position at an angle $\alpha$ of less than ninety degrees. The angle $\alpha$ is formed between a surface on the carrier and a surface on the base frame. The carrier captures each cylinder and each respective captured cylinder is oriented with its valve end and contents label facing the front end of the pallet. The contents label is visible to an operator while in the carrier.

It is another aspect of this invention to provide a transporting system suitable for gas cylinders. The system includes a load-supporting bed forming part of a vehicle and a plurality of longitudinally spaced-apart and laterally extending bays arranged in two longitudinally extending rows disposed on the bed. A walkway is disposed on the bed and raised therefrom, the walkway divides the two longitudinally extending rows. A plurality of pallets, as described above, are used in the system. Once the pallets have been properly loaded into their respective bays, a latching mechanism may engage the base of the pallet to retain the pallet in its respective bay during transportation.

It is a final aspect of this invention to provide a method for delivering gas cylinders. The method comprises the steps of providing a plurality of gas cylinder pallets. Loading a plurality of gas cylinders into the pallets through the front ends of the pallets. After the step of loading, arranging the plurality of gas cylinder pallets into a vehicle payload area in two rows. The front ends of a first row of pallets face the front ends of a second row of pallets. After the step of arranging, unloading, at any given time, any one of the plurality of gas cylinders without moving any of the pallets and without moving any of the other of the plurality of gas cylinders.

DESCRIPTION OF AN EXAMPLE EMBODIMENT

Pallet

Figure 1:
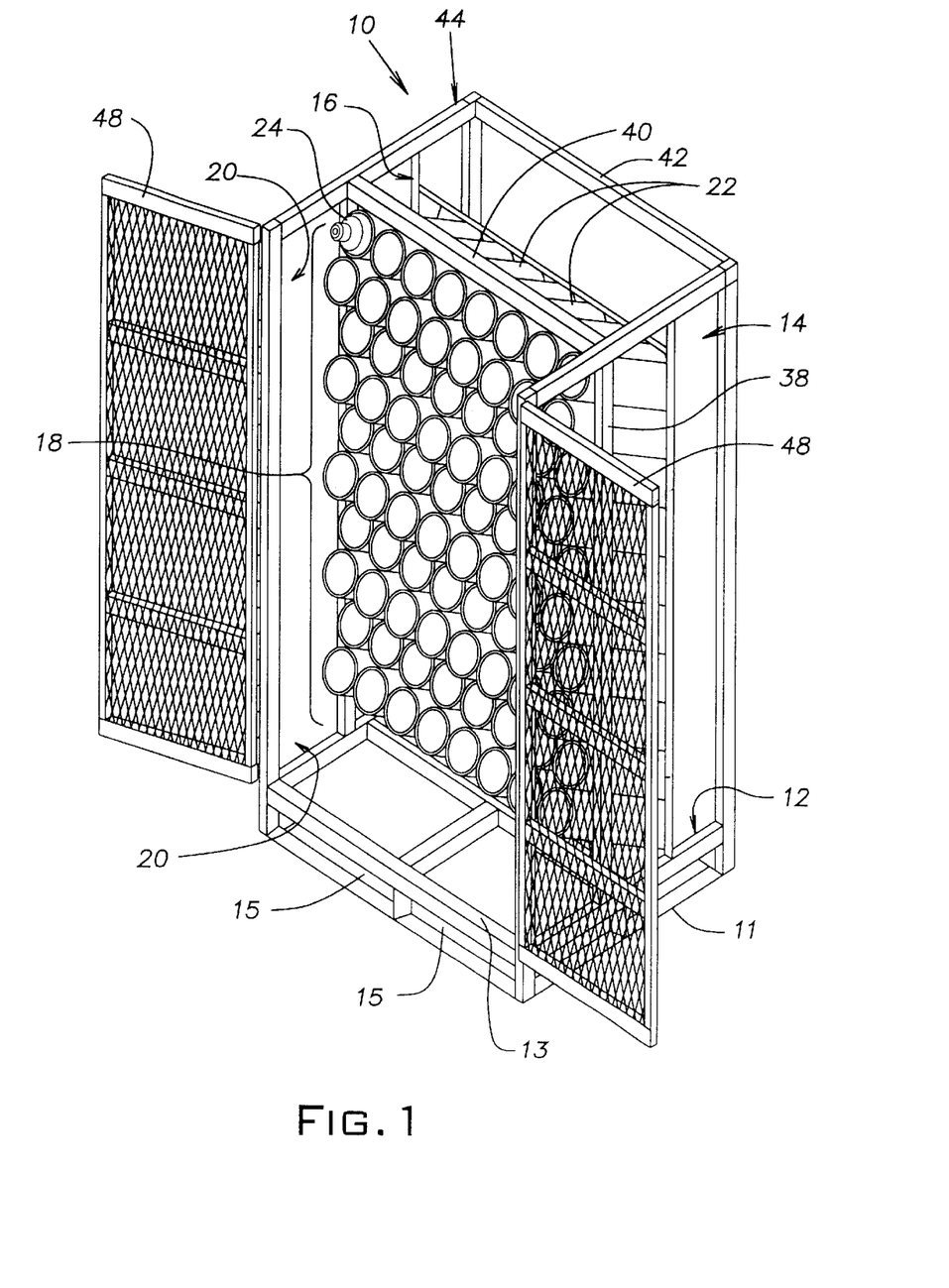
FIG. 1 is a front perspective view illustrating a pallet according to the invention.

Referring to FIG. 1, a pallet according to an embodiment of the present invention is indicated generally by the numeral 10. The pallet 10 includes a supporting base frame 12 with a bottom surface 11. A pair of horizontally spaced, upstanding and parallel side frame members 14, 16 are rigidly secured to the base frame 12. The pallet maybe provided as a metal construction but other materials of equivalent strength may also be used.

Figure 1A:
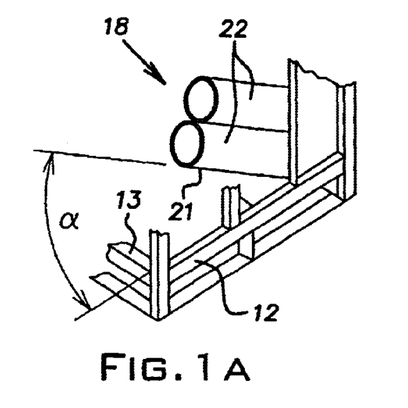
FIG. 1A is a perspective view of a fragmentary portion of the pallet illustrating a cylinder carrier disposed in an inclined position at an angle $\alpha$.

Means, indicated generally by the numeral 18, for retaining a plurality of cylinders are positioned between the side frame members 14, 16. In the illustrated example, the means 18 is provided by a plurality of carriers or tubes 22. Each of the plurality of tubes 22 is disposed in an inclined position at an angle $\alpha$ (FIG. 1A), formed between a tube surface 21 and a top surface 13 of the base frame 12. The angle $\alpha$ is less that ninety degrees, for example 15°, as shown in FIG. 1A.

In the illustrated example (FIG. 1), each of the tubes 22 is cylindrically shaped to carry a cylinder 24. Each cylinder 24 may be filled with a gas such as oxygen, propane, acetylene, argon, nitrogen, or others and each cylinder is labeled accordingly. Each cylinder 24 has a length, a width and a diameter with dimensions that may be specified by a customer. Each cylinder 24 is generally pre-filled with an appropriate gas as mentioned above and as requested by the customer before it is placed into the pallet 10. Each cylinder 24 retained in the carrier 22 is captured and oriented with a valve end and contents label facing a front end 20 of the pallet 10. Once the cylinder 24 is oriented in the pallet 10, the cylinder orientation remains in place throughout the cylinder 24 transportation process.

In the illustrated example (FIG. 1), the capture and orientation of a cylinder 24 is accomplished via each tube 22 having an inner cylindrical diameter that is only slightly larger than the outer diameter of the respective retained cylinder 24.

Figure 1B:
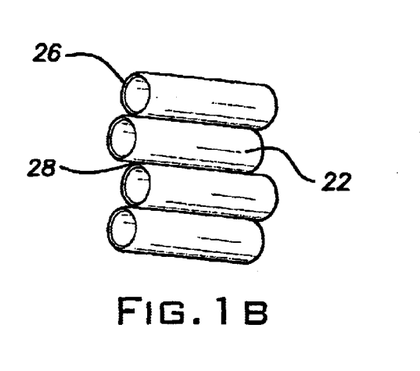
FIG. 1B is a perspective view of a fragmentary portion of the pallet illustrating a plurality of cylinder carriers and an alternating offset for the carriers.

Each tube 22 may be formed from a molded PVC material with a wide angle rounded cylinder entrance edge 26 (FIG. 1B). The edge 26 allows the cylinder 24 to easily enter the tube 22 and reduces damage to the outside surface of the cylinder 24.

As illustrated in the example of FIG. 1, the pallet 10 may contain ten rows of tubes 22 located between the side frames 14, 16 with eight tubes in each row. This arrangement would allow for a total of eighty cylinders to be loaded per pallet 10, which could be considered to be a relatively large loading capacity for the pallet 10.

Figure 3:
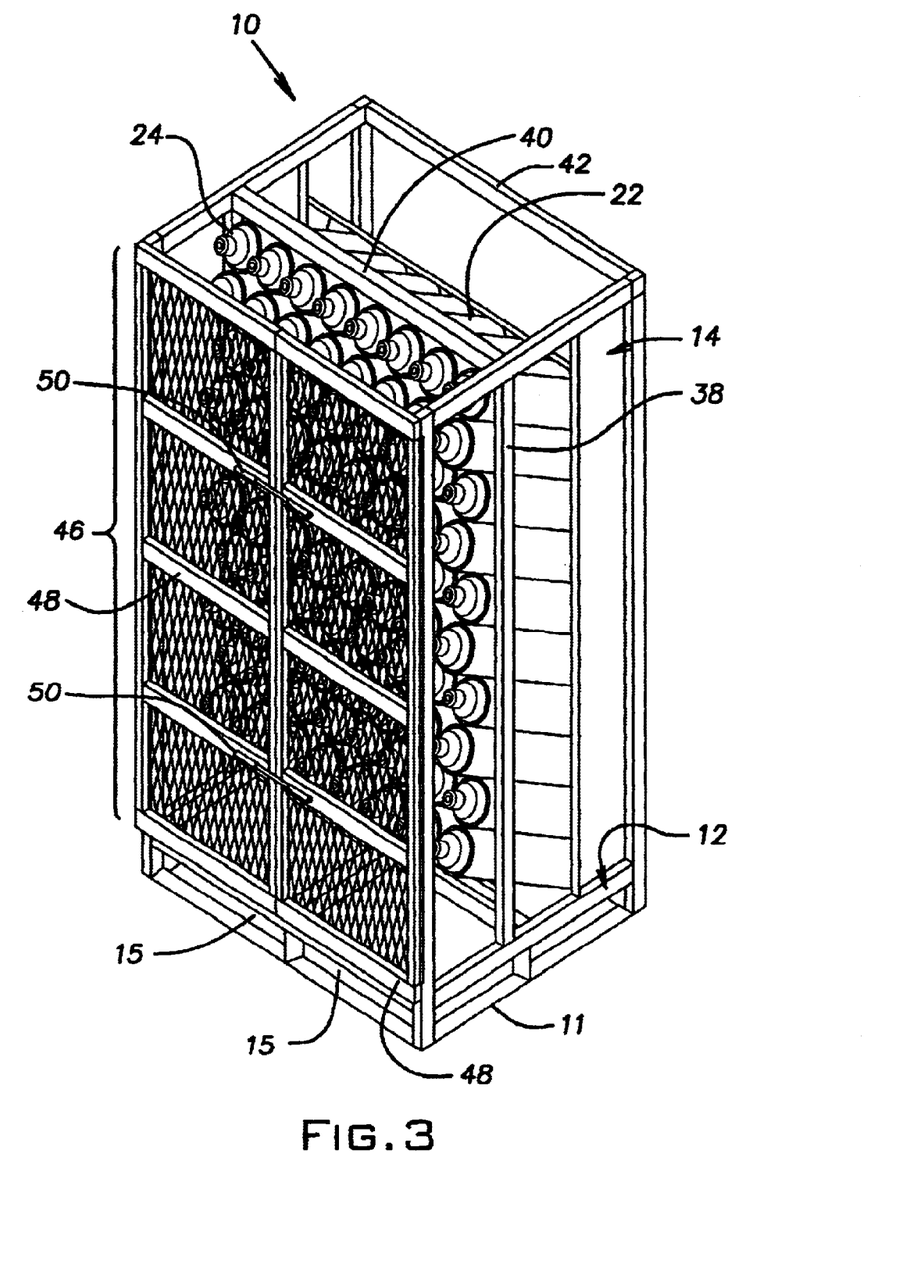
FIG. 3 is a front perspective view of the pallet filled with gas cylinders and ready for transportation.

Each alternate row of the ten rows of tubes 22 may be offset 28 (FIG. 1B) from an adjacent row to allow for better access by an operator to the cylinders 24 when the pallet 10 is fully loaded, for example as illustrated in FIG. 3. Also, the alternating offset 28 (FIG. 1B) allows the operator to recognize the content label on the cylinder 24.

Figure 2:
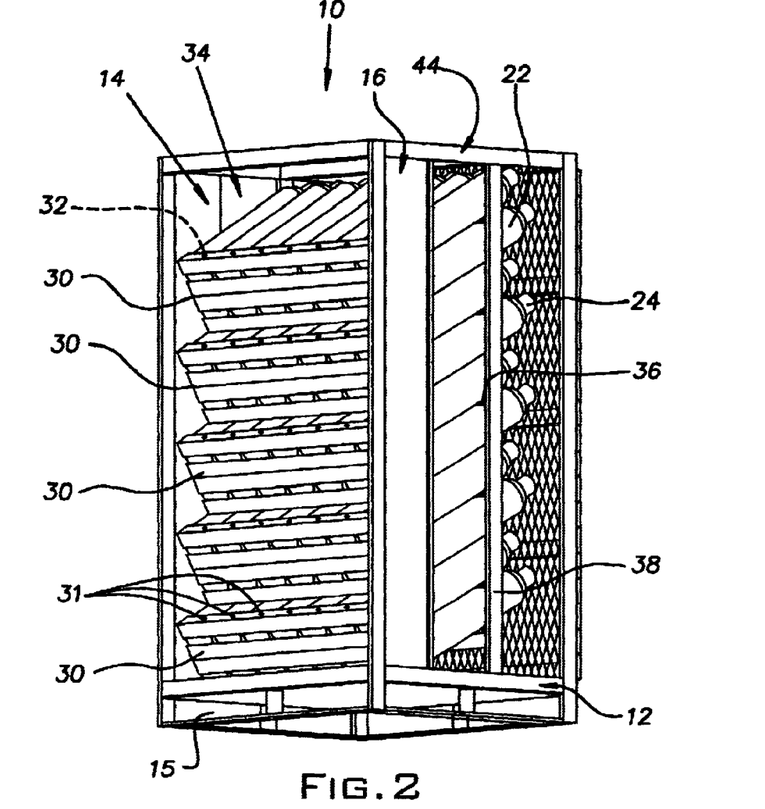
FIG. 2 is rear perspective view of the pallet.

As illustrated in FIG. 2, the tubes 22 may be supported by a plurality of shelves 30 attached between the side frames 14, 16. The shelves 30 are located adjacent to a back side 34 of the pallet 10. Each shelf 30 may hold two rows of tubes 22. Each shelve 30 positions the respective tube 22 such that the respective cylinder 24 is positioned in the inclined position at an angle $\alpha$. Tubes 22 are attached to shelves 30 by attachment means 31, for example a rivet, or some other similar form of attachment means 31, such as screws, nuts and bolts, and adhesives.

Due to the inclination of the tubes 22, the bottom or butt end 32 of the cylinders 24 are lowest so that the bottom ends 32 of cylinders 24 rests against its respective shelf 30. Thus, use of tubes 22 requires no additional securing mechanism to hold the cylinders 24 in place during transport.

Figure 4:
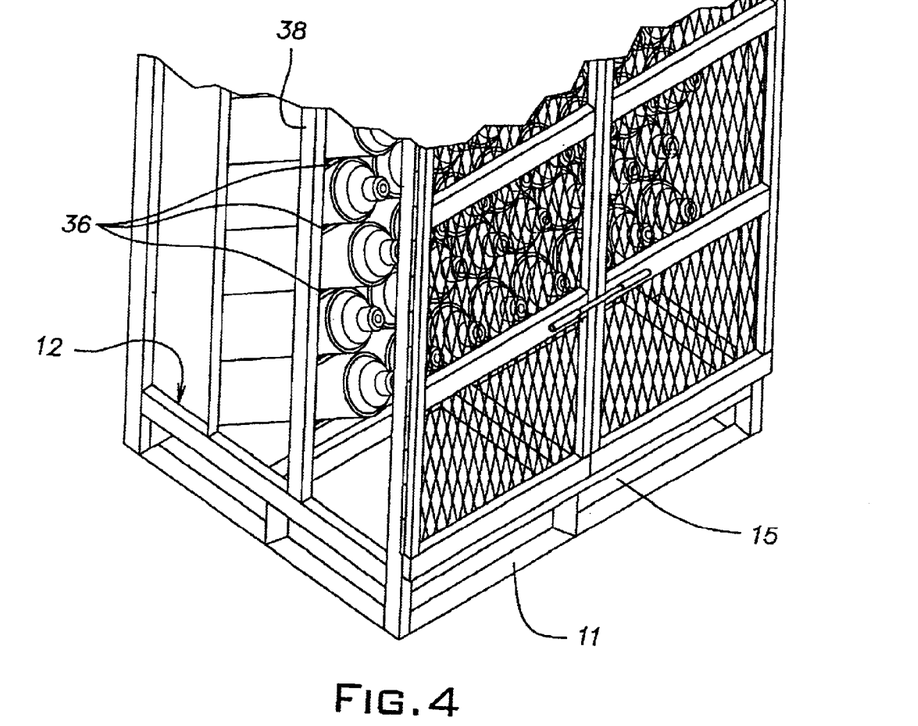
FIG. 4 is an enlarged side perspective view of a bottom half of the pallet.
Figure 4A:
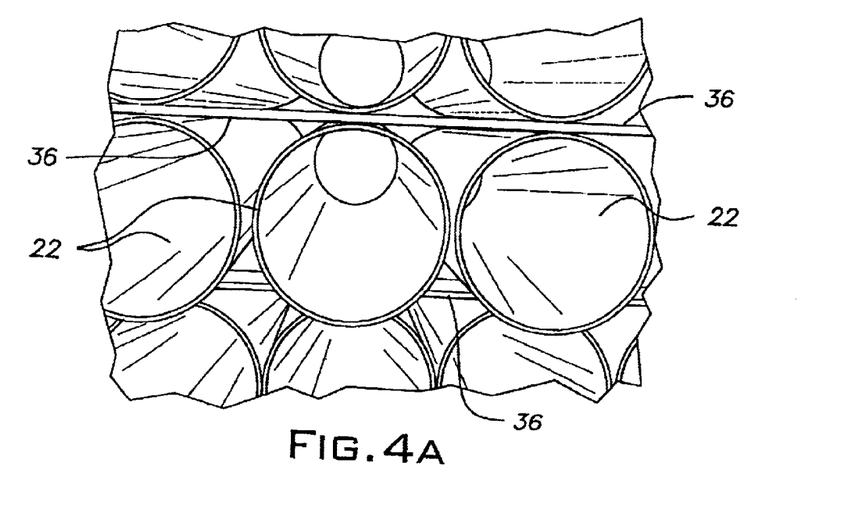
FIG. 4A is an enlarged view of a fragmentary portion of the pallet illustrating the cylinder carriers and carrier front end support members.

The tubes 22 are further supported by a series of cross members 36 extending between the sides 14, 16 adjacent to the front side 20 of the pallet 10. As shown in FIGS. 4 & 4A, cross members 36 are attached, for example by a weld, to support members 38 on sides 14, 16 of pallet 10. A front end of tube 22 rests on cross member 36 as shown in FIG. 4A.

Alternatively, the tubes 22 in pallet 10 may be provided in a horizontal position (i.e., angle of a equally 0°). If the tubes 22 are provided in the horizontal position, a lip or front wall (not shown) may be provided on each tube 22 to retain the respective cylinder 24 in the pallet 10 while the pallet 10 is in use.

As illustrated in FIGS. 1 and 3, top structural connecting members 40 and 42 are located near the top 44 of the pallet 10. These members 40, 42 provide support to the top 44 of pallet 10 and may alternatively be used to attach a mechanism (not shown) to lift the pallet 10 from overhead.

Figure 5:
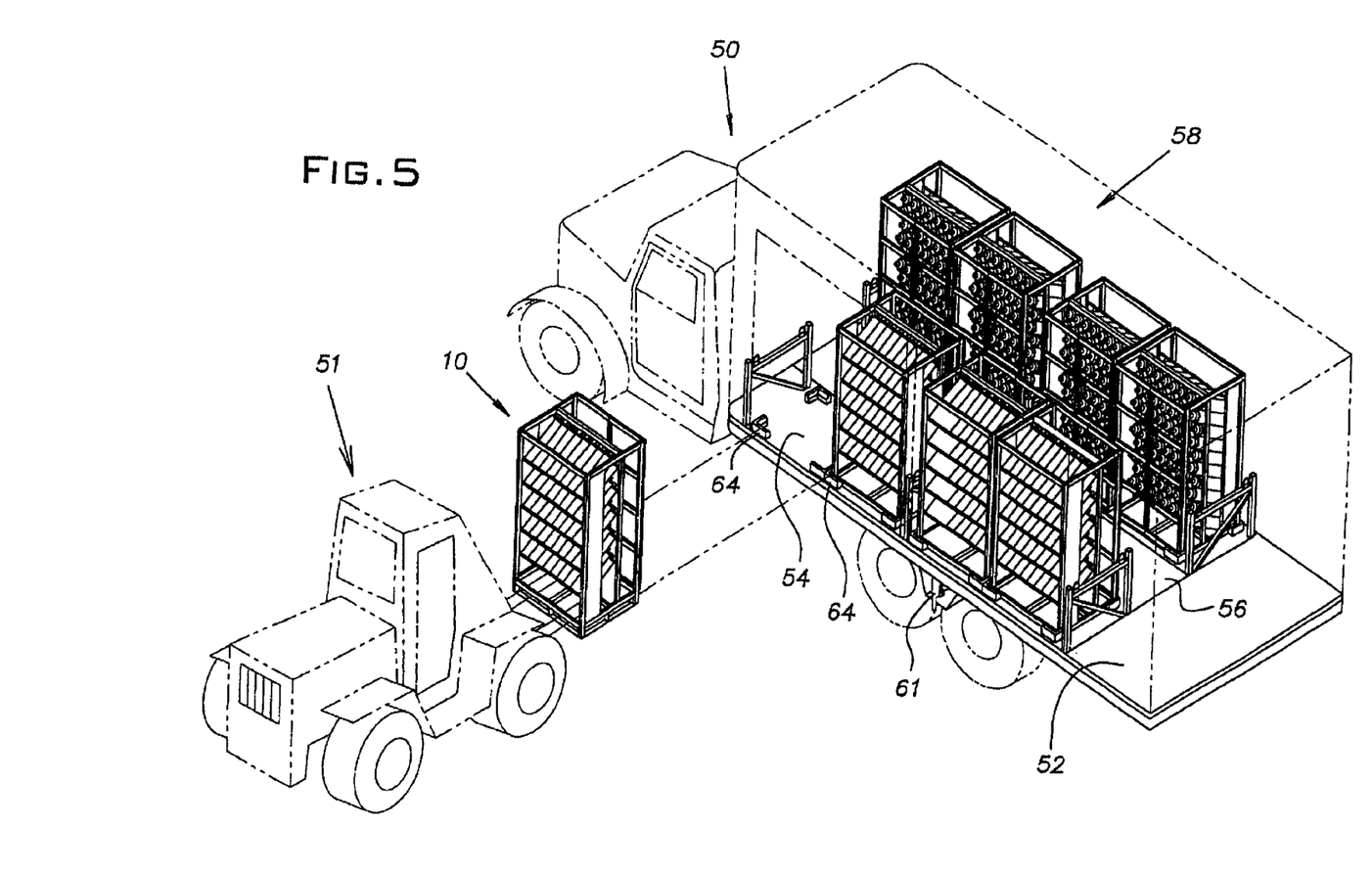
FIG. 5 is a perspective view of a delivery system showing the pallet being loaded into a transportation system and onto a delivery truck.

In the illustrated example, the base portion 12 has openings 15 for receiving the tines of a fork truck or pallet loader-unloader (e.g., 51, see FIG. 5). The base portion 12 (FIG. 1) may also be provided without the openings 15. As discussed above, alternative lifting means may be provided for lifting the pallet 10 from the top 44. The base portion 12 may be provided as a metal construction and the metal construction should be of a sufficient strength to support the tubes 22 fully loaded with cylinders 24 as shown in FIG. 3.

The front end 20 of the respective pallet 10 is substantially open. The front end 20 does not have any vertical posts or horizontal members and serves as an area through which cylinders 24 are loaded and unloaded into pallet 10.

As will be appreciated from FIG. 3, the pallet 10 may include means, indicated generally by the numeral 46, for securing the front end 20 of the pallet 10. In the illustrated example, this means 46 may be provided as a gate means 46. The gate means 46 may include, for example, a pair of locking doors 48 that substantially enclose the front end 20 of the respective pallet 10. Straps, chains and other types of sheet metal structures that enclose the front end of the pallet 10 may also be used as the gate means 46. The pair of locking doors 48, includes door latches 50. The door latches 50 keep the doors 48 locked during transportation of the pallet 10. The locking doors 48 are spaced apart from the cylindrically shaped individual carriers or tubes 22 at the front end 20 of the pallet 10 to enhance free flow of air through the pallet. Free flowing air helps vent any gas which may be inadvertently released from the cylinders 24 located in tubes 22.

As a result of this newly designed pallet with the cylinder 24 disposed at an inclined angle $\alpha$, there is no need to prearrange the pallet 10 during loading of the pallet 10 into a delivery system discussed herein. The pallet 10 does not need to be loaded in a predetermined manner into the delivery system in order to properly deliver a gas cylinder to a targeted gas consumer because an operator (e.g., delivery personnel) will have access to every gas cylinder 24 on every pallet 10.

Cylinder Transportation System

Gas cylinders 24 to be transported are inserted into the open front end 20 of pallet 10 (FIG. 1) and into the tubes 22 with the valve end adjacent to the pallet front end 20. Compared to vertically transported cylinders in which cylinders 24 must be lifted vertically over the top of a support structure or other cylinders must be rearranged, see FIG. 10 labeled PRIOR ART, the cylinders 24 supported in the inclined tubes 22 of the pallet 10 can be easily inserted and removed from the pallet 10 by an operator (e.g., delivery personnel).

The particular construction of the pallet 10 as described above using the inclined tube arrangement can be varied, while still usable with the system of the present invention. The disclosed structure thus has an inherent flexibility not present with systems of the prior art.

As shown generally in FIG. 5, the features of a palletized cylinder distribution system using the above described pallet 10 will now be described in general. A plurality of the pallets 10 are arranging in a payload area 58 of a covered truck 50 that transports gas cylinders 24. Also, the truck 50 has side doors (not shown) that are opened to permit arrangement of pallet 10 in the payload area 58. Alternatively, the truck 50 may not contain a cover and/or side doors. The pallets 10 are each individually loaded by a loader-unloader 51, see FIG. 5, and once loaded maybe held in place in their appropriate bay 54 using a latching mechanism 60 (FIG. 6) initiated by valve 61.

Figure 6:
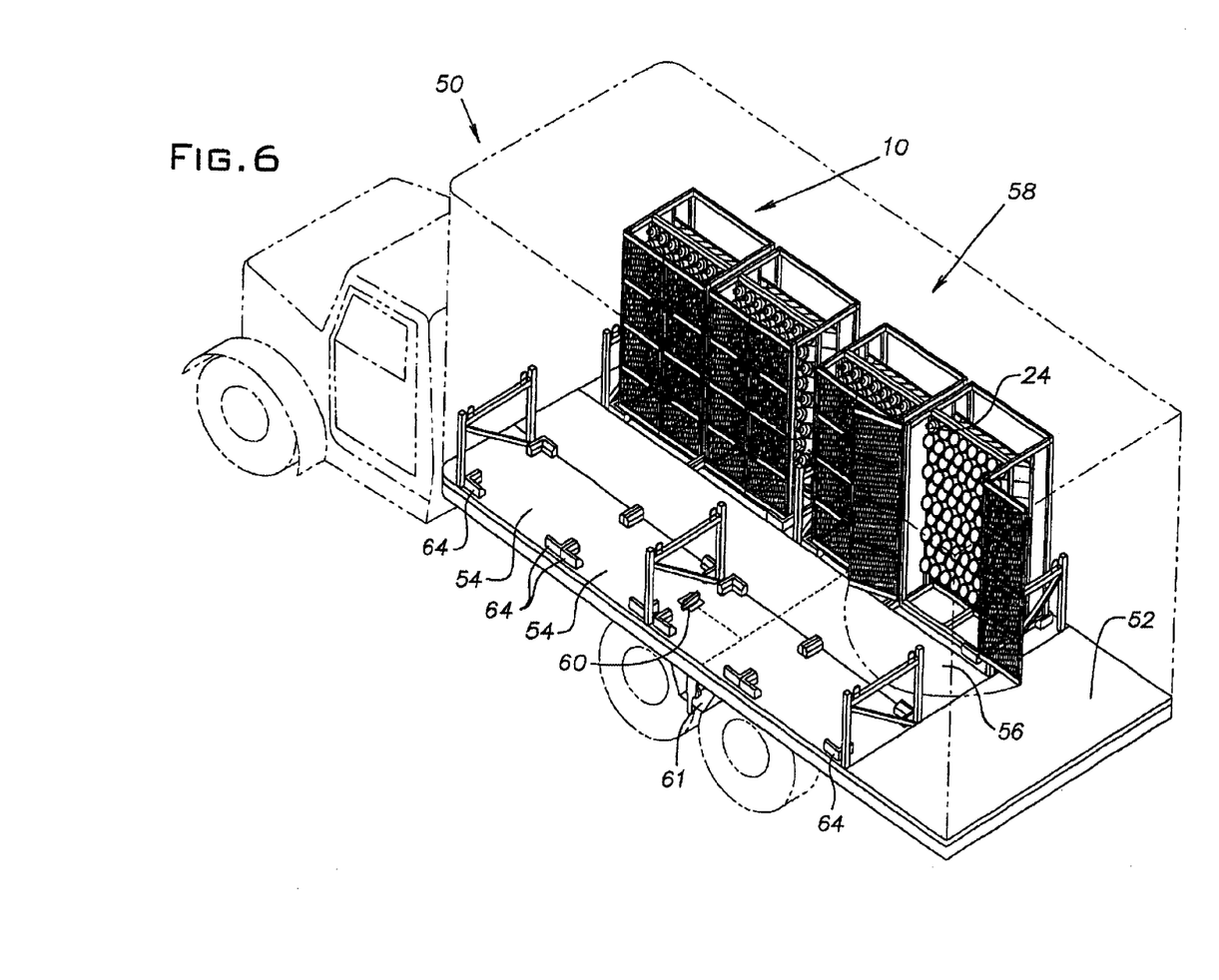
FIG. 6 is a perspective view of pallets loaded onto the delivery truck with one of the pallets having its doors open.

Referring to FIG. 6, the pallets 10 are arranged on the truck 50 such that there is a center walkway 56 in the payload area 58 with pallets 10 lined up along each side of the center walkway 56. The front end 20 of each pallet 10 faces toward the center of walkway 56 of the payload area 58. Thus, front access to each pallet via the center walkway 56 is provided, and thereby, access to each gas cylinder 24 via the center walkway 56 is provided (FIG. 9).

Figure 9:
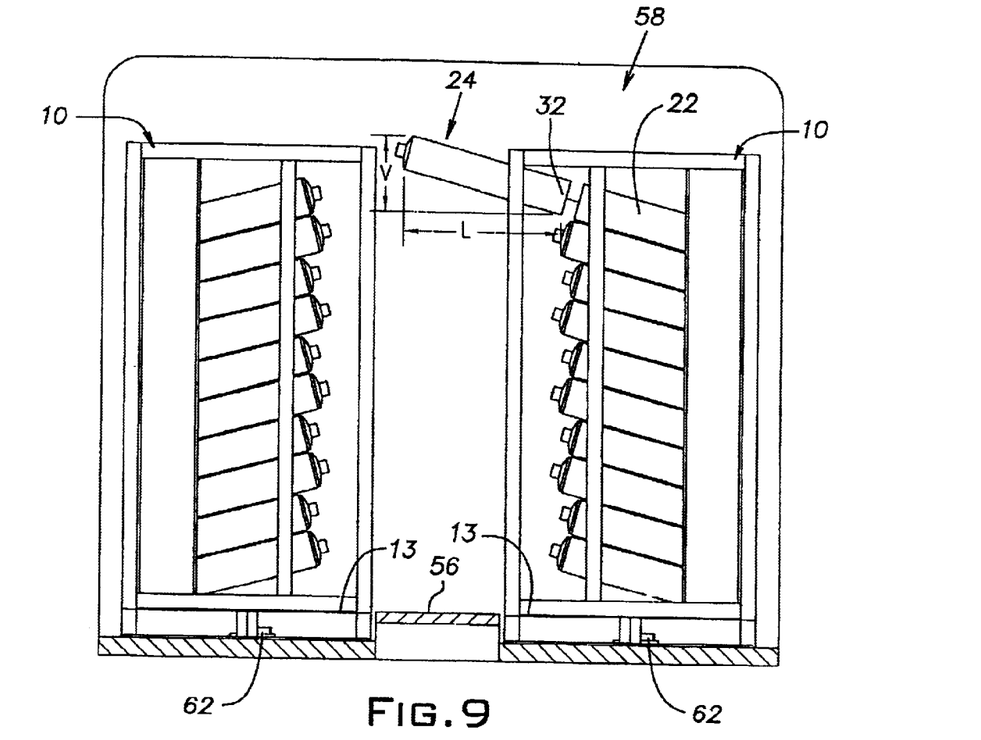
FIG. 9 is a cross-sectional view, taken along line 9—9 of FIG. 7 and additionally shows a gas cylinder removed from the pallet.

As best seen in FIG. 9, the base 12 of the pallet 10 is of a sufficient height that the top surface 13 of the base 12 is substantially level with the walkway 56. In order to remove a gas cylinder 24 from pallet 10, the cylinder 24 is slide out into the area of the walkway 56.

As will be appreciated, there must be sufficient clearance between the pallets 10 opposing each other across the walkway 56 to permit handling of the cylinders 24. Since each cylinder 24 and the tube 22 in which it slides into and out of are inclined or angled upward, the walkway 56 need not be equal to the true axial length of the cylinder. Rather, the walkway 56 must be at least as wide as the horizontal component (L, see FIG. 9) of the cylinder length, or the distance between the ends of the cylinder, as measured along the floor, with the cylinder 24 at the angle $\alpha$.

Likewise, the ceiling of the truck payload area 58 must be sufficiently high to provide clearance between the topmost tubes 22, as shown in FIG. 9, and the ceiling, for removal of the topmost cylinders 24 in each pallet 10. Since the cylinders 24 are not stored vertically, the upmost clearance from the topmost tubes 22 need not be equal to the full length of the cylinders 24. The minimum ceiling clearance is equal to the vertical component (V, see FIG. 9) of the cylinder length, or the distance between the ends of the cylinder, as measured along an axis perpendicular to the floor, with the cylinder 24 at the angle $\alpha$.

Accordingly, each gas cylinder 24 can be individually accessed and delivered to a customer regardless of where it is located on the truck 50, without any need to rearrange any other gas cylinders 24 or any of the pallets 10. In addition, the pallets 10 can be loaded into the truck 50 with the gas cylinders 24 loaded onto the pallet 10 in an arbitrary manner.

As a result of the system and the use of the pallet 10, there is no need to prearrange the gas cylinders 24 or the pallets 10 in some predetermined manner in order to properly deliver the gas cylinders 24 to the targeted gas consumers, as the operator (e.g., delivery personnel) will have access to every gas cylinder 24 in every pallet 10 being transported for delivery.

As shown generally in FIG. 6, the transporting system suitable for gas cylinders 24 using the pallet 10 described above, will now be described in detail. A load-supporting bed 52 forms part of the vehicle 50 used to transport the gas cylinders 24 to a customer. A plurality of the bays 54 are disposed on the bed 52 of the vehicle 50. The bays 54 are longitudinally spaced-apart and are laterally extending. The bays 54 are arranged in two longitudinally extending rows disposed on the bed 52 of vehicle 50. Each bay 54 contains corner pieces 64 that position and contain the pallet base 12 into its respective bay 54. The walkway 56 is also disposed on the bed 52 of vehicle 50 and is raised therefrom (FIG. 9). The walkway 56 is located between the two longitudinally extending rows of pallets 10.

A plurality of pallets 10, as described above, are used in the system (FIG. 5) with each pallet 10 comprising the supporting base frame 12, side frame members 14, 16 rigidly secured to the base frame 12 and the plurality of carriers or tubes 22 for retaining the plurality of cylinders 24. The plurality of carriers or tubes 22 are located between the side frame members 14, 16. The plurality of tubes 22 are disposed in an inclined position at an angle $\alpha$ and capture and orient the cylinder 24. The plurality of pallets 10 are arranged to be carried by the loader-unloader 51 respectively into and out of the bays 54 with the front end 20 of pallet 10 being the side loaded adjacent the walkway 56.

Figure 6A:
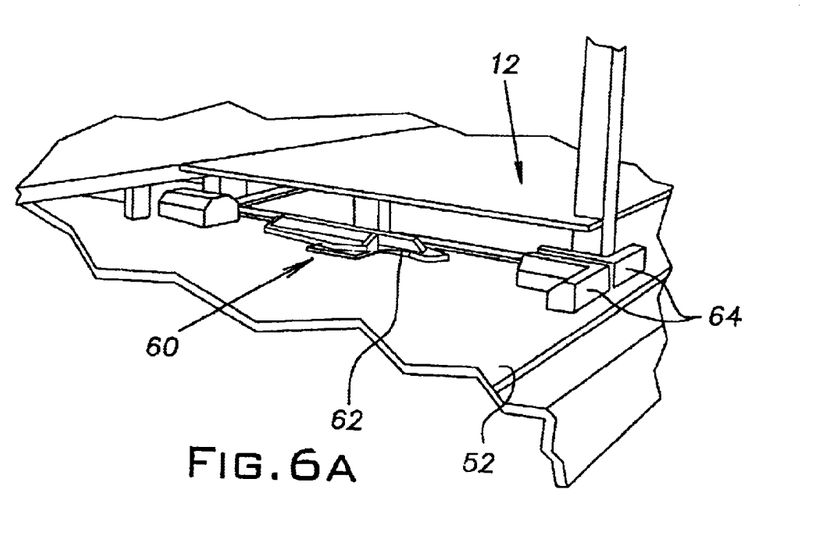
FIG. 6A is a perspective view of a fragmentary portion of the pallet and a fragmentary portion of a vehicle bed with a latching mechanism in an unlatched condition.
Figure 6B:
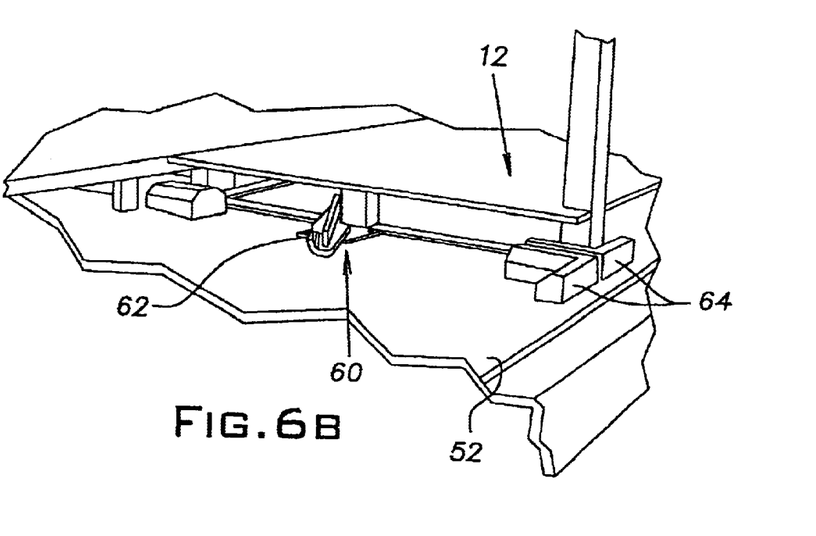
FIG. 6B is a perspective view of a fragmentary portion of the pallet and a fragmentary portion of the vehicle bed with the latching mechanism in a latched condition.
Figures 7, 8:
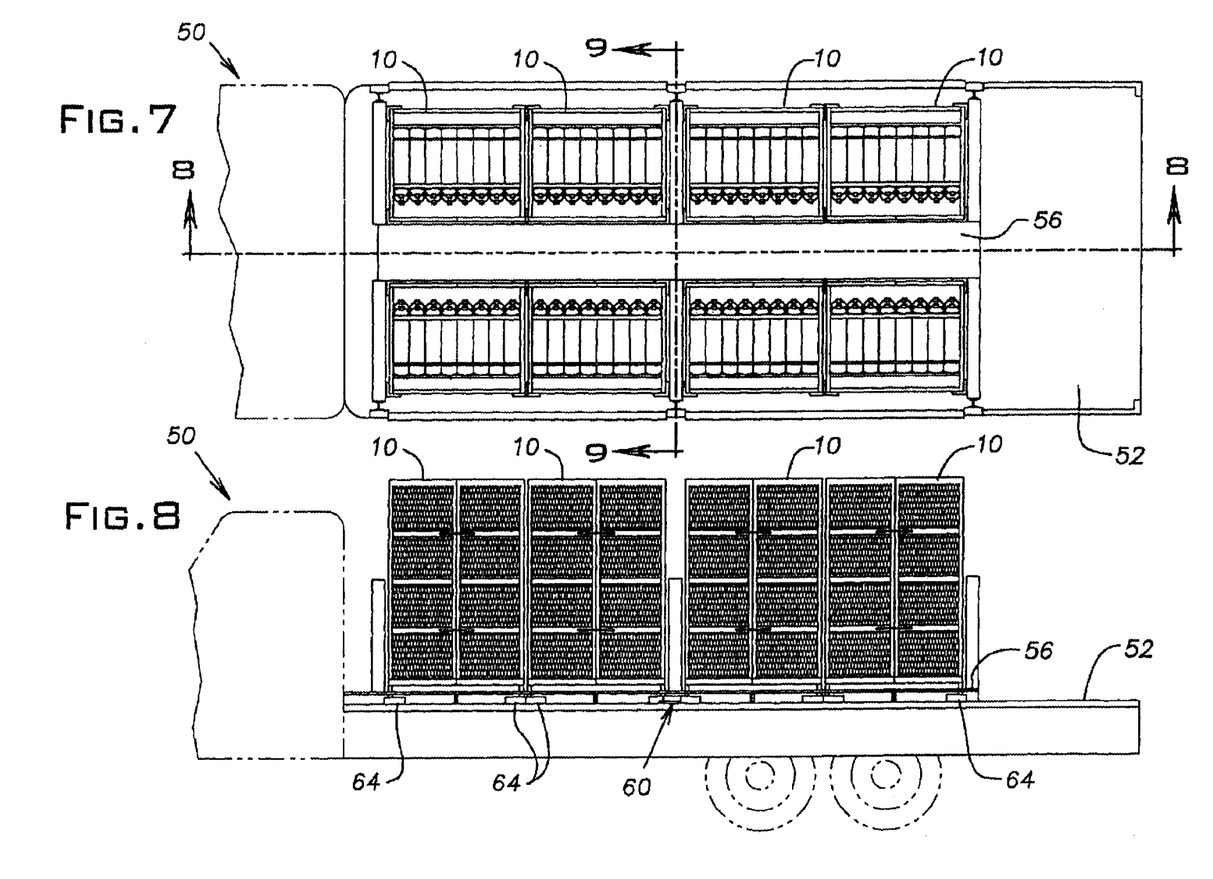
FIG. 7 is a top view of a fully loaded truck.
FIG. 8 is a cross-sectional view, taken along line 8—8 of FIG. 7.

Once the pallets have been loaded into their respective bays 54, a latching mechanism 60 (FIGS. 6A & 6B) may engage the base 12 of the pallets 10 to retain the engaged pallets in their respective bays 54 during transportation. The latching mechanism 60 may be pneumatically or hydraulically powered and contains a pawl 62 that engages the pallet base 12 to secure the pallet base 12 to the bed 52 during transportation of the pallet 10. The pawl 62 is activated by an operator actuating a valve 61 (FIG. 6) or the like. Once activated, one pawl 62 may engage two pallets 10 that are loaded in adjacent bays as shown in FIGS. 6A & B. One or more pawls 62 and one or more latching mechanisms 60 may be included within the cylinder transportation system discussed above.

The operation of the system will now be described. In the loading stage, a plurality of gas cylinder pallets 10 are provided. A plurality of gas cylinders 24 are loaded into the pallets 10 through the front end 20 of the pallets 10. In loading the plurality of gas cylinders 24, any gas cylinder may be loaded into any pallet 10 and it is not necessary to load each pallet with cylinders 24 of only one type of gas.

After the cylinders 24 are loaded into the pallets 10, the doors of the truck 50 are opened and the plurality of gas cylinder pallets 10 are arranged into the vehicle payload area 58 in two rows, in which the front end 20 of a first row of pallets 10 face a front end 20 of a second row of pallets 10. The pallets 10 may then be secured into position by the pallet latching mechanism 60.

Once the truck 50 has arrived at the customer location, the system may be unloaded at any given time and any one of the plurality of gas cylinders 24 may be unloaded without moving any of the pallets 10 and without moving any of the other of the plurality of gas cylinders 24.

The operator (e.g., delivery personnel) of the system walks onto the walkway 56 and walks to the pallet 10 containing cylinders 24 of the desired type of gas. An individual cylinder 24 can be lifted out of its respective pallet 10 and rolled along the walkway 56, and onto the tailgate. The process is repeated at each different customer location.

It is understood that the invention may be modified in various ways within the scope of the disclosure. The invention is therefore not limited to the precise embodiment disclosed and includes all variations that are deemed to be within the spirit and scope of the following claims.

What is claimed is:

1. A pallet for use in supporting and transporting gas cylinders in an inclined position, the pallet comprising:
   a supporting base frame, the base frame adapted to receive the tines of a fork lift vehicle, whereby the pallet can be loaded and unloaded from a transporting truck;
   a pair of horizontally spaced, upstanding and parallel side frame members rigidly secured to the base frame;
   a front end adapted to load and unload a plurality of cylinders; and
   retaining means, positioned between the side frame members, for retaining a plurality of cylinders in an inclined position at an angle α of less than ninety degrees, the retaining means including means for engaging and capturing each cylinder, each respective captured cylinder being oriented with a valve end being a closest portion of the cylinder to the front end of the pallet and visible by an operator, whereby once the cylinder is in the pallet, the cylinder orientation remains in place throughout the cylinder transportation process.

2. The pallet according to claim 1 wherein the pallet includes means, at the front end of the pallet, for enclosing the cylinders within the pallet.

3. The pallet according to claim 2 wherein the front end enclosing means include a pair of locking doors that substantially enclose the front end of the respective pallet.

4. The pallet according to claim 1 wherein the means for capturing of the retaining means includes a plurality of individual carriers, each carrier having an inner cylindrical diameter that is only slightly larger than the outer diameter of the respective captured cylinder.

5. The pallet according to claim 4 wherein the carriers are made from a molded PVC material with each carrier having a wide angle rounded cylinder entrance edge.

6. The pallet according to claim 4 wherein the carriers are arranged in ten rows with eight carriers in each row.

7. The pallet according to claim 4 wherein the carriers are supported by a shelf located between and attached to the side frames such that the cylinders are each positioned at the angle α of approximately 15°.

8. A transporting system suitable for gas cylinders comprising:
   a load-supporting bed forming part of a vehicle;
   a plurality of bays arranged in two longitudinally extending rows disposed on the bed;
   a walkway disposed on the bed and raised therefrom, the walkway extending between the two longitudinally extending rows;
   a plurality of pallets, each pallet comprising a supporting base frame, the base frame adapted to receive the tines of a fork lift vehicle, whereby the pallet can be loaded and unloaded from a transporting truck; a pair of horizontally spaced, upstanding and parallel side frame members rigidly secured to the base frame, a front end adapted to load and unload a plurality of cylinders, retaining means, positioned between the side frame members, for retaining a plurality of cylinders in an inclined position at an angle α of less than ninety degrees, the retaining means including means for engaging and capturing each cylinder, each respective captured cylinder being oriented with a valve front end being a closest portion of the cylinder the front end of the pallet and visible by an operator, whereby once the cylinder is in the pallet, the cylinder orientation remains in place throughout the cylinder transportation process, the plurality of pallets arranged to be carried by a loader-unloader respectively into and out of the bays, the pallets being generally openable on the front end, the open side being the side adjacent the walkway; and
   one or more latching mechanisms that engage the base of the pallets to retain the pallet in its respective bays during transportation.

9. The system according to claim 8 wherein the means for capturing of the retaining means includes a plurality of individual carriers, each carrier shaped to capture and orient a respective cylinder, each carrier having an inner cylindrical diameter that is only slightly larger than the outer diameter of the respective captured cylinder.

10. The system of transporting of claim 9, wherein a vehicle payload area comprises a ceiling surface, and wherein a distance between a top surface of each of the plurality of pallets and the ceiling surface is sufficient to enable a cylinder retained by one of the carriers to be removed from one of the plurality of pallets.

11. The system of transporting of claim 9, wherein a vehicle payload area comprises a ceiling surface, wherein the gas cylinder has a length, wherein the length of the gas cylinder as supported by the carrier has a vertical component that is perpendicular to the base of the pallet, wherein an overhead clearance of each of the plurality of pallets is measured as the shortest distance between the top surface of the pallet to the ceiling surface, and wherein the overhead clearance of each of the plurality of pallets is greater than or equal to the vertical component of the length of the gas cylinder.

12. The system of transporting of claim 9, wherein the aisle has dimensions sufficient to enable a cylinder retained by one of the carriers to be removed from one of the plurality of pallets.

13. The system of transporting of claim 9, wherein the gas cylinder has a length, wherein the length of the gas cylinder as supported by the carrier has a horizontal component that is inclined to the base of the pallet, wherein the aisle has a width measured along the bed in a lateral direction of the longitudinal axis, and wherein the width of the aisle is greater than or equal to the length of the horizontal component.

14. The system of transporting of claim 9, wherein the carrier is disposed in an inclined position at an angle α of approximately 15°.

15. The system of transporting of claim 14, wherein each of the carriers is supported by a shelf, and wherein the gas cylinder is supported at a bottom end by the respective shelf.

16. A pallet for use in supporting and transporting gas cylinders in an inclined position, the pallet comprising:
   a supporting base frame, the base frame adapted to receive the tines of a fork lift vehicle, whereby the pallet can be loaded and unloaded from a transporting truck;
   a pair of horizontally spaced, upstanding and parallel side frame members rigidly secured to the base frame;
   a plurality of shelves located between and attached to the side frames such that the cylinders are each positioned at the angle α of approximately 15° on their respective shelf;
   a front end adapted to load and unload a plurality of cylinders;
   a plurality of individual carriers, positioned between the side frame members and attached to a respective shelf, for retaining a plurality of cylinders in an inclined position, each carrier having an inner cylindrical diameter that is only slightly larger than the outer diameter of a respective cylinder for capturing the cylinder, each respective captured cylinder being oriented with a valve end and contents label facing the front end of the pallet and visible by an operator, whereby once the cylinder is in the pallet, the cylinder orientation remains in place throughout the cylinder transportation process; and a plurality of cross members extending between the side frame members for under-support of the individual carriers.

17. The pallet according to claim 16 wherein the carriers are made from a molded PVC material with each carrier having a wide angle rounded cylinder entrance edge.

18. A pallet for use in supporting and transporting gas cylinders in an inclined position, the pallet comprising:

a supporting base frame, the base frame adapted to receive the tines of a fork lift vehicle, whereby the pallet can be loaded and unloaded from a transporting truck;

a pair of horizontally spaced, upstanding and parallel side frame members rigidly secured to the base frame;

a plurality of shelves located between and attached to the side frames such that the cylinders are each positioned at the angle α of approximately 15° on their respective shelf;

a front end adapted to load and unload a plurality of cylinders, including means at the front end of the pallet for enclosing the cylinders within the pallet; and a plurality of individual carriers, positioned between the side frame members and attached to a shelf, for retaining a plurality of cylinders in an inclined position, the carriers are arranged in ten rows with eight carriers in each row, each carrier having an inner cylindrical diameter that is only slightly larger than the outer diameter of a respective captured cylinder, each respective captured cylinder being oriented with a valve end and contents label facing the front end of the pallet and visible by an operator, whereby once the cylinder is in the pallet, the cylinder orientation remains in place throughout the cylinder transportation process.

19. The pallet according to claim 18 wherein the carriers are made from a molded PVC material with each carrier having a wide angle rounded cylinder entrance edge.

20. Apparatus suitable for transportation and distribution of a plurality of gas cylinders, the apparatus comprising:

a plurality of pallets, each of the pallets having a base, each of the pallets being capable of capturing a plurality of gas cylinders in an non-vertical inclined position at an angle α;

a payload area inside a truck comprising a ceiling surface, and wherein a distance between a top surface of each of the plurality of pallets and the ceiling surface is sufficient to enable a captured cylinder to be removed from one of the plurality of pallets;

a plurality of longitudinally spaced-apart and laterally extending bays arranged in two longitudinally extending rows with a center walkway between the rows disposed on a truck bed, the pallets being open on one side, the pallets being arranged in the bays with the open side being adjacent the walkway, the base of the pallets being of sufficient height that the surface of the pallets is substantially level with the walkway; and a latching mechanism that engages the base of the pallets to retain the pallets in their respective bays to unload the cylinders from the pallet.

21. A method for delivering gas cylinders, comprising the steps of:

providing a plurality of gas cylinder pallets, each of the pallets having a front end, each of the pallets being capable of capturing and securing a plurality of gas cylinders in an non-vertical inclined position at an angle α in a retaining means;

loading a plurality of gas cylinders into the pallets through the front end of the pallets;

after the step of loading, arranging the plurality of gas cylinder pallets into a vehicle payload area in two rows, wherein the front ends of the first rows of pallets face the front ends of the second row of pallets; and after the step of arranging, unloading, at any given time, any one of the plurality of gas cylinders without moving any of the pallets and without moving any of the other of the plurality of gas cylinders.

22. The method of delivering of claim 21, wherein each of the plurality of pallets is arranged into a vehicle payload area with a fork lift vehicle utilizing tine-receiving openings on the pallet.

* * * * *

UNITED STATES PATENT AND TRADEMARK OFFICE
CERTIFICATE OF CORRECTION

PATENT NO. : 6,685,404 B2
DATED : February 3, 2004
INVENTOR(S) : Joseph Udivich et al.

It is certified that error appears in the above-identified patent and that said Letters Patent is hereby corrected as shown below:

Title page,
Item [56], References Cited, U.S. PATENT DOCUMENTS, please insert the following:
-- 4,642,007    2/1987    Marshall et al.    410/78 --.

Column 3,
Line 9, please delete "maybe", and insert therefor -- may be --.

Signed and Sealed this

Thirteenth Day of July, 2004

JON W. DUDAS
*Acting Director of the United States Patent and Trademark Office*